US011945229B2

United States Patent

(12) United States Patent
Takahashi et al.

(10) Patent No.: US 11,945,229 B2
(45) Date of Patent: Apr. 2, 2024

(54) LIQUID DISCHARGE APPARATUS, LIQUID CONTAINER, AND REFILL CONTAINER

(71) Applicants: Kenta Takahashi, Kanagawa (JP); Takashi Watanabe, Tokyo (JP); Takeyuki Kobayashi, Kanagawa (JP); Kazuyoshi Matsumoto, Tokyo (JP)

(72) Inventors: Kenta Takahashi, Kanagawa (JP); Takashi Watanabe, Tokyo (JP); Takeyuki Kobayashi, Kanagawa (JP); Kazuyoshi Matsumoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 106 days.

(21) Appl. No.: 17/695,836

(22) Filed: Mar. 16, 2022

(65) Prior Publication Data

US 2022/0305796 A1 Sep. 29, 2022

(30) Foreign Application Priority Data

Mar. 25, 2021 (JP) ................................ 2021-051094

(51) Int. Cl.
*B41J 2/175* (2006.01)
*B41J 29/13* (2006.01)

(52) U.S. Cl.
CPC ....... *B41J 2/17506* (2013.01); *B41J 2/17503* (2013.01); *B41J 2/17509* (2013.01); *B41J 2/1754* (2013.01); *B41J 2/17543* (2013.01); *B41J 29/13* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1754; B41J 2/17543; B41J 29/13
See application file for complete search history.

(56) References Cited

U.S. PATENT DOCUMENTS

| | | | | |
|---|---|---|---|---|
| 9,387,684 | B2 * | 7/2016 | Ogawa | B41J 2/1753 |
| 2007/0109362 | A1 | 5/2007 | Hori et al. | |
| 2016/0325550 | A1 | 11/2016 | Masaoka et al. | |
| 2019/0184709 | A1 | 6/2019 | Hasebe et al. | |
| 2019/0255854 | A1 | 8/2019 | Asano et al. | |
| 2019/0299624 | A1 * | 10/2019 | Mizutani | B41J 2/17506 |
| 2020/0079091 | A1 | 3/2020 | Takahashi et al. | |
| 2021/0394516 | A1 | 12/2021 | Takahashi | |

FOREIGN PATENT DOCUMENTS

| | | |
|---|---|---|
| JP | 2005-059490 | 3/2005 |
| JP | 2017-205895 | 11/2017 |

* cited by examiner

*Primary Examiner* — Anh T Vo
(74) *Attorney, Agent, or Firm* — XSENSUS LLP

(57) ABSTRACT

A liquid discharge apparatus includes a head configured to discharge a liquid, and a liquid container configured to contain the liquid to be supplied to the head. The liquid container includes an inlet from which the liquid is supplied to the liquid container, a first lid configured to cover and openably close the inlet, the first lid having a first fitting part fittable to a first key detachably attached to a refill bottle containing the liquid.

15 Claims, 7 Drawing Sheets

COMPARATIVE EXALMPLE

| | BLACK |
|---|---|
| LIQUID TANK SHAPE OF FIRST FITTING PART |   |
| CLEANING LIQUID BOTTLE SHAPE OF THIRD FITTING PART |   |

LIQUID DISCHARGE APPARATUS, LIQUID CONTAINER, AND REFILL CONTAINER

CROSS-REFERENCE TO RELATED APPLICATIONS

This patent application is based on and claims priority pursuant to 35 U.S.C. § 119(a) to Japanese Patent Application No. 2021-051094, filed on Mar. 25, 2021, in the Japan Patent Office, the entire disclosure of which is hereby incorporated by reference herein.

BACKGROUND

Technical Field

Aspect of this disclosure relates to a liquid discharge apparatus, a liquid container, and a refill container.

Related Art

A liquid discharge apparatus such as a printer feeds a liquid from a liquid supply container to a liquid container installed in an apparatus body of the printer to perform continuous printing for a long time.

For example, the liquid container has a liquid inlet, from which a liquid is supplied to the liquid container and a first fitting part provided around the liquid inlet. The liquid supply container has a liquid outlet to supply a liquid to the liquid container and a second fitting part provided around the liquid inlet. The first fitting part and a second fitting part are fitted to each other so that liquid is supplied from the liquid outlet to the liquid inlet.

SUMMARY

In an aspect of this disclosure, a liquid discharge apparatus includes a head configured to discharge a liquid, and a liquid container configured to contain the liquid to be supplied to the head. The liquid container includes an inlet from which the liquid is supplied to the liquid container, a first lid configured to cover and openably close the inlet, the first lid having a first fitting part liftable to a first key detachably attached to a refill bottle containing the liquid.

In another aspect of this disclosure, a liquid container for use in a liquid discharge apparatus includes a container body containing a liquid, an inlet from which the liquid is supplied to the container body, a first lid configured to cover and openably close the inlet, the first lid having a first fitting part finable to a first key detachably attached to a refill bottle containing the liquid.

In still another aspect of this disclosure, a refill container containing a liquid to be supplied to a liquid container in a liquid discharge apparatus, an outlet from which the liquid is supplied to the liquid container, and a first key detachably attached to the outlet, the first key finable to a first fitting part of a first lid of the liquid container.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
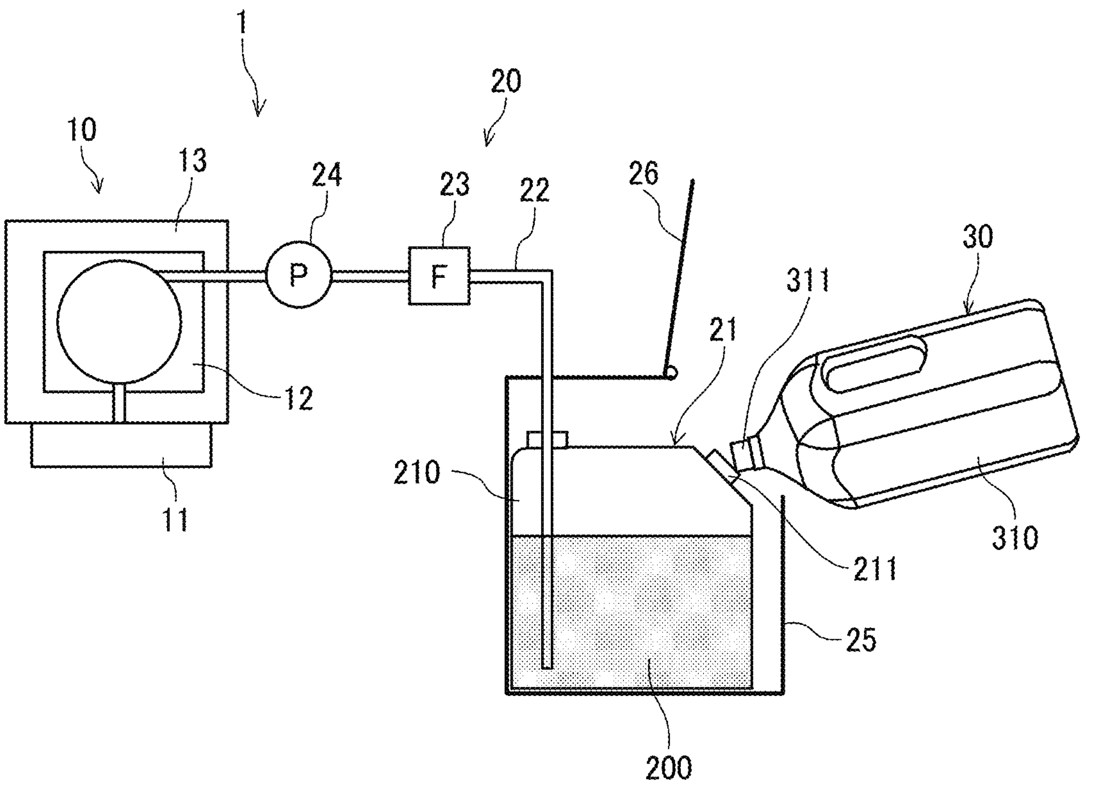
FIG. 1 is a side view of a liquid discharge apparatus according to a first embodiment the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

Referring now to the drawings, embodiments of the present disclosure are described below. As used herein, the singular forms “a”, “an”, and “the” are intended to include the plural forms as well, unless the context clearly indicates otherwise.

It will also be understood that when an element is referred to as being “connected” or “coupled” to another element, it can be directly connected or coupled to another element or intervening elements may be present. In contrast, when an element is referred to as being “directly connected” or “directly coupled” to another element, there are no intervening elements present. Referring now to the drawings, wherein like reference numerals designate identical or corresponding parts throughout the several views, embodiments of the present disclosure are described below.

A liquid discharge apparatus according to a first embodiment of the present disclosure is described with reference to FIG. 1.

FIG. 1 is a schematic side view of a part of a printer 1 according to the first embodiment of the present disclosure.

The printer 1 serving as the liquid discharge apparatus includes a liquid discharger 10 and a liquid supply system 20. The liquid discharger 10 discharges a liquid. The liquid supply system 20 supplies a liquid to the liquid discharger 10.

The liquid discharger 10 includes a head 11, a sub tank 12, and a carriage 13. The head 11 serves as a liquid discharge device having a nozzles to discharge a liquid. The sub tank 12 supplies a liquid to the head 11. The carriage 13 mounts the head 11 and the sub tank 12 on the carriage 13. The carriage 13 is reciprocally movable in a main scanning direction parallel to a paper surface. The carriage 13 is reciprocally movable in a horizontal direction orthogonal to the paper surface (in a depth direction to the paper surface).

The liquid supply system 20 supplies a liquid to the head 11. The liquid supply system 20 includes a liquid tank serves as a liquid storage container. Hereinafter, the liquid storage container is simply referred to as a "liquid container". The liquid tank 21 as the liquid container is installed in the apparatus body of the printer 1. The liquid tank 21 stores a liquid. Liquid is supplied from the liquid tank 21 to the head 11 via a liquid supply path 22. The liquid supply path 22 includes a filter 23 and a liquid feed pump 24 serving as a liquid feeder.

A housing 25 contains the liquid tank 21 inside the housing 25. The housing 25 includes an operable cover 26. The liquid tank 21 is replenished with ink 200 as a liquid from a refill bottle 30 serving as a refill container.

The liquid container may not be a replaceable container detachably attachable to the apparatus body of the printer 1 such as the liquid tank 21. The liquid container may be fixed to the housing 25 so that the liquid container and the housing 25 form a single body.

Next, the liquid tank 21 as the liquid container and the refill bottle 30 as the riffle container are described below with reference to FIG. 2.

Figure 2A:
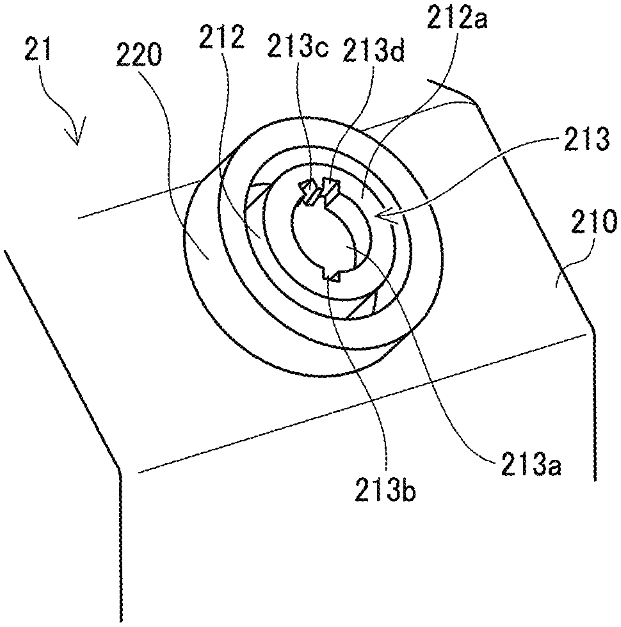
FIGS. 2A and 2B are perspective views of a part of a liquid tank and a refill bottle.
Figure 2B:
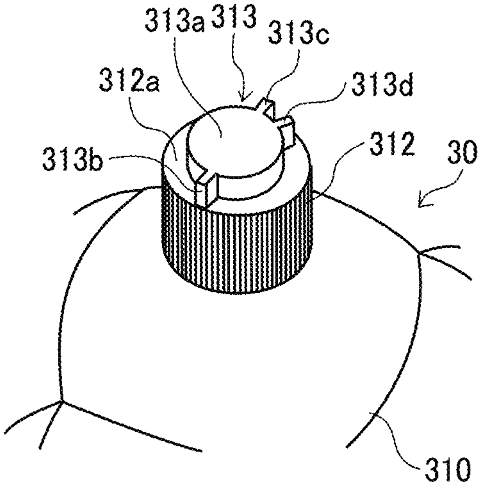

FIGS. 2A and 2B are perspective views of a main part of the liquid tank 21 and the refill bottle 30.

The liquid tank 21 includes a tank body 210 (container body), an inlet 211, and a first lid 212. The tank body 210 stores liquid. The liquid in the refill bottle 30 is supplied into liquid tank 21 through the inlet 211 (see FIG. 1). The first lid 212 covers the inlet 211 and is openably closable. Thus, the first lid 212 covers and openably close the inlet 211.

As illustrated in FIG. 2A, the liquid tank 21 includes a first fitting part 213 on a top surface 212*a* of the first lid 212 of the liquid tank 21. The first, lid 212 has the first fitting part 213 as one of a part of the first lid 212. The first lid 212 and the first fitting part 213 are formed as one body.

The first fitting part 213 includes a recess 213*a* recessed from the top surface 212*a* of the first lid 212 and three recesses 213*b*, 213*c*, and 213*d* recessed in a radial direction from a wall surface of the recess 213*a*.

Further, the liquid tank 21 includes a surrounding part 220 (wall) that rises from the tank body 210 and surrounds a periphery of the first lid 212. Accordingly, the first lid 212 is in a state of being embedded inside the surrounding part 220. Thus, the surrounding part 220 prevents the user from directly gripping and operating the first lid 212.

The refill bottle 30 also serves as a refill container. The refill bottle 30 includes a bottle body 310 (container body), an outlet 311, and a second lid 312. The bottle body 310 stores the ink 200 as a liquid. The ink 200 in the refill bottle 30 is supplied into the inlet 211 of the liquid tank 21 from the outlet 311 of the refill bottle 30 (see FIG. 1). The second lid 312 covers the outlet 311 and is openably closable.

The second lid 312 of the refill bottle 30 is a first key that is detachably attached to the refill bottle 30. As illustrated in FIG. 2B, the refill bottle 30 includes a second fitting part 313 on a top surface 312*a* of the second lid 312 of the refill bottle 30. The second fitting part 313 includes a protrusion 313*a* protruding from the top surface 312*a* of the second lid 312 and three protrusions 313*b*, 313*c*, and 313*d* protruding in a radial direction from the wall surface of the protrusion 313*a*.

Here, the protrusion 313*a* of the second fitting part 313 of the second lid 312 of the refill bottle 30 is fitted into the recess 213*a* of the first fitting part 213 of the first lid 212 of the liquid tank 21. Similarly, the protrusions 313*b* to 313*d* of the second fitting part 313 of the second lid 312 of the refill bottle 30 are respectively fitted into the recesses 213*b* to 213*d* of the first fitting part 213 of the first lid 212 of the liquid tank 21.

Accordingly, the second lid 312 of the refill bottle 30 functions as the first key that openably closes the first lid 212 of the liquid tank 21. Further, the second lid 312 is detachably attached to the refill bottle 30 since the second lid 312 is a lid member.

Thus, the protrusions 313*b* to 313*d* of the second lid 312 (first key) of the refill bottle 30 respectively protrude in multiple radial directions; and the recesses 213*b* to 213*d* of the first fitting part 213 of the first lid 212 of the liquid tank 21 are respectively disposed in the multiple radial directions corresponding to the protrusions 313*b* to 313*d* respectively fitted to the recesses 213*b* to 213*d*.

Next, a liquid supply (refill) operation from the refill bottle 30 to the liquid tank 21 is described below with reference to FIG. 3.

Figure 3:
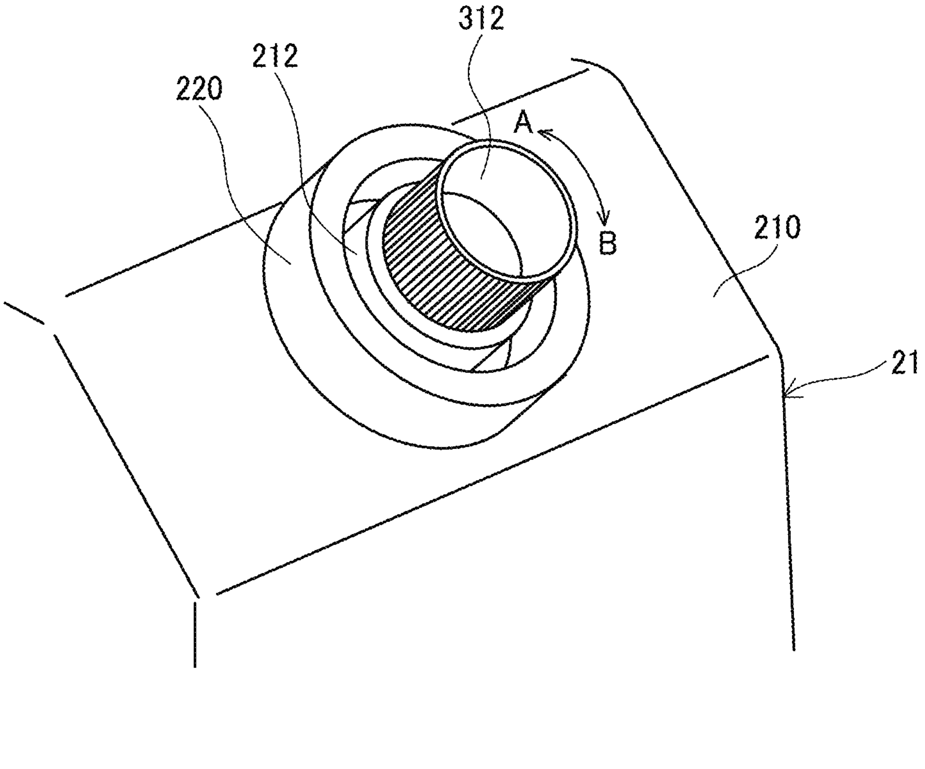
FIG. 3 is an enlarged partial perspective view of the liquid tank illustrating a liquid supply (refill) operation.

FIG. 3 is an enlarged partial perspective view of the liquid tank 21 illustrating the liquid supply (refill) operation.

When the ink 200 in the refill bottle 30 is supplied to the liquid tank 21, the second lid 312 of the refill bottle 30 is removed (detached) from the bottle body 310.

Then, as illustrated in FIG. 3, the second fitting part 313 of the removed (detached) second lid 312 is fitted to the first fitting part 213 of the first lid 212 of the liquid tank 21. In the above fitted state in which the second lid 312 is fitted to the first fitting part 213, the second lid 312 is rotated in a direction indicated by arrow "A" in FIG. 3, for example, so that the first lid 212 can be removed (detached) from the inlet 211 of the liquid tank 21 to open the inlet 211.

Thus, the first lid 212 of the liquid tank 21 is rotatable and removable by the second lid 312 (first key) fitted to the first fitting part 213 to open the inlet 211.

Then, as illustrated in FIG. 1, the ink 200 is supplied (poured) from the outlet 311 of the refill bottle 30 into the inlet 211 of the liquid tank 21 to replenish the liquid tank 21 with the ink 200.

In the above-described way, the second lid 312 of the refill bottle 30 is removed (detached) from the refill bottle 30, and the second lid 312 is fitted to the first lid 212 of the liquid tank 21 as the first key to open the first lid 212.

Accordingly, the first lid 212 of the liquid tank 21 is easily opened without performing an operation of lifting the refill bottle 30 and fitting the refill bottle 30 to the liquid tank 21. Thus, operability of refilling work (replenishing work) is improved. Particularly, the liquid tank 21 and the refill bottle 30 in the first embodiment improve efficiency in the refilling work (replenishing work) in a large-sized printer. In the large-sized printer, a capacity of the liquid tank 21 (liquid container) containing ink is large, a capacity of the refill bottle 30 (refill container) is also large, so that the refill bottle 30 (refill container) becomes heavy.

When the first lid 212 of the liquid tank 21 is closed, the second lid 312 removed (detached) from the refill bottle 30 is fitted to the first lid 212 again and rotated in a direction indicated by arrow "B" in FIG. 3 to close the inlet 211 of the liquid tank 21 with the first lid 212.

Next, shapes of fitting parts of multiple liquid tanks 21 (liquid containers) and the multiple refill bottles 30 (refill containers) according to the first embodiment is described below with reference to FIG. 4.

Figure 4:
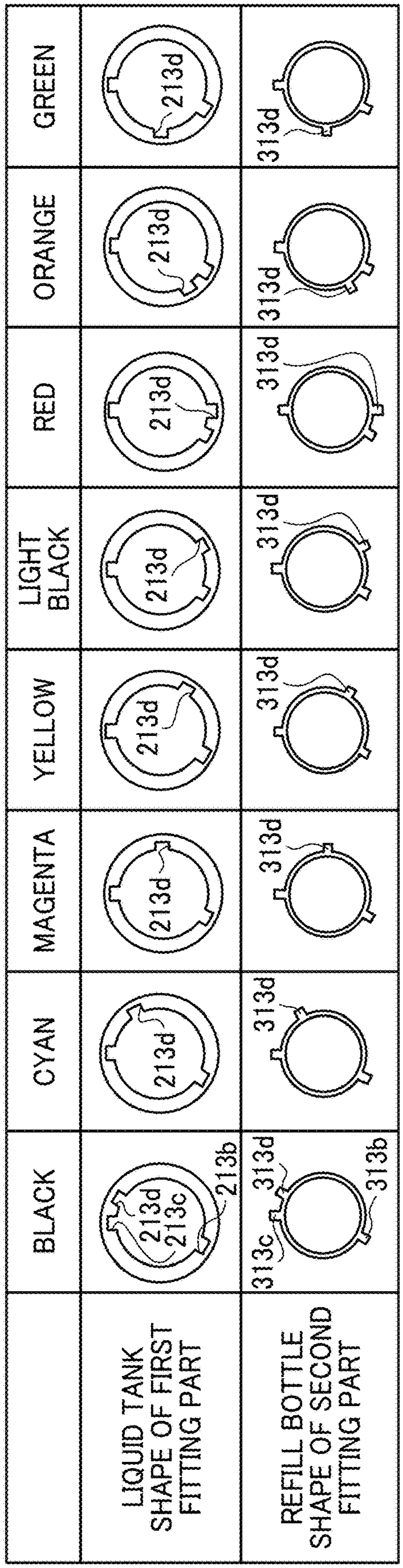
FIG. 4 is a table illustrating the shapes of fitting parts of multiple liquid tanks (liquid containers) and multiple refill bottles (refill containers)

FIG. 4 is a table illustrating the shapes of the fitting parts of the multiple liquid tanks 21 (liquid containers) and the multiple refill bottles 30 (refill containers).

The printer 1 according to the first embodiment includes multiple liquid tanks 21 as multiple liquid containers. Liquids of different types (colors) are stored in the liquid tanks 21, respectively.

As illustrated in FIG. 4 the printer 1 includes eight liquid tanks 21 as the multiple liquid tanks 21 containing inks of colors of black (K), cyan (C), magenta (M), yellow (Y), light black (LB), red (R), orange (0), and green (G), for example.

Here, the recesses 213*b* and 213*c* of the first fitting parts 213 of the multiple liquid tanks 21 are disposed at an identical position in a circumferential direction in all of the liquid tanks 21. That is, each of the first fitting parts 213 of the multiple liquid tanks 21 includes the recesses 213*b* and 213*c* serving as common fitting parts common among the multiple liquid tanks 21.

On the other hand, the recess 213*d* of each of the first fitting parts 213 of the multiple liquid tanks 21 is disposed at a different position in the circumferential direction for each of the liquid tanks 21 of each color.

Similarly, the refill bottles 30 of respective colors include the second fitting parts 313 including the protrusions 313*b* to 313*d* respectively fitted to the recesses 213*b* to 213*d* of the first fitting part 213 of the liquid tank 21 corresponding to the respective colors.

With such a configuration, when a color of the liquid tank 21 to be replenished with the ink 200 is different from a color of the refill bottle 30, the second fitting part 313 of the second lid 312 of the refill bottle 30 may not be fitted to the first fitting part 213 of the liquid tank 21.

Accordingly, the first lid 212 of the liquid tank 21 of a color other than the color to be refilled may not be opened. Thus, the printer 1 prevent color mixture of the inks.

The liquid tank 21 (liquid containers) includes multiple liquid tanks 21 respectively contain multiple types of liquids, and the multiple liquid tanks 21 (liquid containers) respectively include first fitting parts 213 having different shapes with each other, and one of the first fitting parts 213 of one of the multiple liquid tanks 21 is fittable to only one of first keys (second lid 312) of one of refill bottles 30 containing the liquid, a type of which is same as one of the multiple types of liquids in said one of the multiple liquid tanks 21.

Thus, the refill bottle 30 includes multiple refill bottles 30 each including the first key (second lid 312) having a shape different from shapes of other first keys (second lids 312). The liquid tank 21 includes multiple liquid tanks 21 configured to respectively contain multiple types of liquids 200, the multiple liquid tanks 21 each including the first fitting part 213 having a shape different from shapes of other first fitting parts 213, and the first fitting part 213 of one of the multiple liquid tanks 21 is fittable only to the first key (second lid 312) of one of the multiple refill bottles 30 corresponding to said one of the multiple liquid tanks 21.

Comparative Example 1 is described below with reference to FIG. 5.

Figure 5:
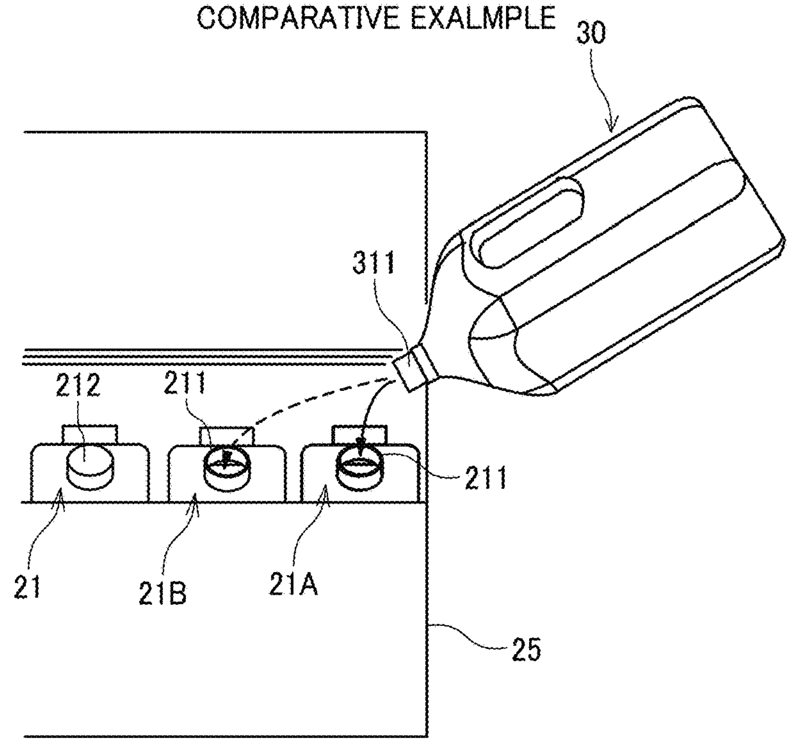
FIG. 5 is a schematic front view of a housing of the printer in Comparative Example illustrating an occurrence of color mixture during a refill operation.

FIG. 5 is a schematic front view of the housing 25 of the printer 1 in Comparative Example 1 illustrating an occurrence of the color mixture during a refill operation.

In Comparative Example 1, the inlet 211 of the liquid tank 21 is opened and closed by the first lid 212 as a normal cap that does not have the first fitting part 213 as in liquid tank 21 according to the first embodiment.

Therefore, as illustrated in FIG. 5, the liquid is supplied (poured) from the refill bottle 30 into predetermined liquid tanks 21 with the inlets 211 of the multiple liquid tanks 21A and 21B open. When such refilling work is performed, ink that bounces or spills is mixed into the liquid tank 21 of another color, and the color mixture occurs.

Specifically, a case is considered in which the user mistakenly opens the inlet 211 of the liquid tank 21B. The liquid tank 21B contains ink of a color different from a color of the ink 200 in the refill bottle 30. Although the user notices an error in selection of liquid tank 21A and 21B by looking at the color of the ink 200 in the liquid tank 21B, the user also opens the inlet 211 of the liquid tank 21A to supply ink 200 from the refill bottle 30 to the liquid tank 21A without closing the inlet 211 of the liquid tank 21B.

The liquid tank 21A contains ink 200 of a color same as the color of the ink 200 in the refill bottle 30. At such a time, the rebounded ink from the refill bottle 30 or the like may be mixed into the adjacent liquid tank 21B to cause color mixture of the ink 200.

Another case is considered in which the user forget to close the inlet 211 of the liquid tank 21A after supplying ink 200 from the refill bottle 30 to the liquid tank 21A. Then, the user opens the inlet 211 of the liquid tank 21B to supply ink 200 from the refill bottle 30 to the liquid tank 21B adjacent to the liquid tank 21A. At such a time, the rebounded ink from the refill bottle 30 or the like may be mixed into the adjacent liquid tank 21A to cause color mixture of the ink 200.

Still another case is considered in which the user mistakes the color of ink 200 to be refilled such that the user opens the inlet 211 of the liquid tank 21 of a color such as light magenta and red close to magenta when the user plans to refill the ink 200 of magenta to the liquid tank 21 of magenta. Then, the user may replenish the liquid tank 21 of magenta with ink 200 of light magenta and red close to but different from magenta without noticing the mistake. Such a case also causes the color mixture of ink 200.

Conversely, the printer 1 (liquid discharge apparatus) according to the first embodiment prevents opening of the first lid 212 of the liquid tank 21 when a color of ink 200 of the liquid tank 21 is different from a color of ink 200 of the refill bottle 30. Thus, the printer 1 (liquid discharge apparatus) according to the first embodiment reduces occurrence of color mixture as described in Comparative Example 1.

Next, the refill operation of a cleaning liquid of the liquid tank 21 (liquid container) is described with reference to FIG. 6.

Figure 6:
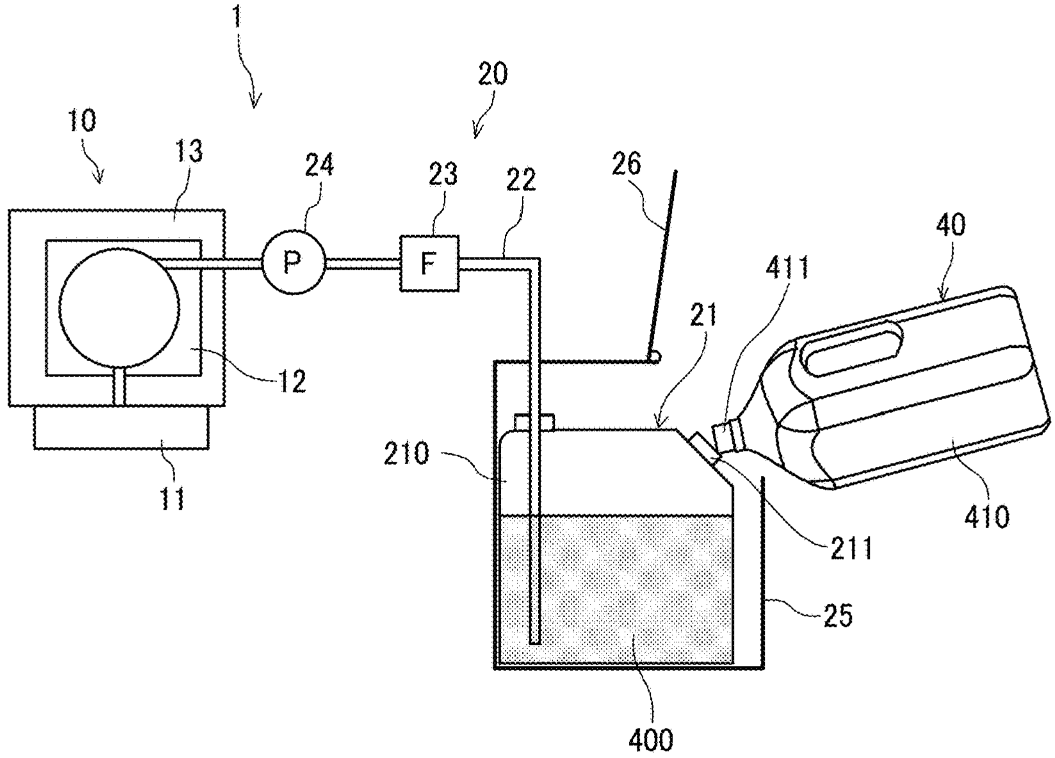
FIG. 6 is a schematic side view of the printer illustrating the refill operation to replace the liquid in the liquid tank (liquid container) to a cleaning liquid.

FIG. 6 is a schematic side view of the printer 1 illustrating the refill operation of the cleaning liquid.

In the printer 1 using liquid, a replacement operation is performed when a color arrangement of ink is changed, when the printer 1 is stored and not used for printing for a long time, or when the printer 1 is transported, for example. The replacement operation replaces the ink 200 in a liquid path such as the liquid supply path 22 in the printer 1 with the cleaning liquid 400 (or storage liquid).

Therefore, in the printer 1 (liquid discharge apparatus) according to the first embodiment, the liquid tank 21 is emptied and refilled with the cleaning liquid 400 from a cleaning bottle 40 serving as a cleaning container.

Next, a cleaning bottle 40 (cleaning container) is described below with reference to FIG. 7, FIG. 8, and FIGS. 9A and 9B.

Figure 7:
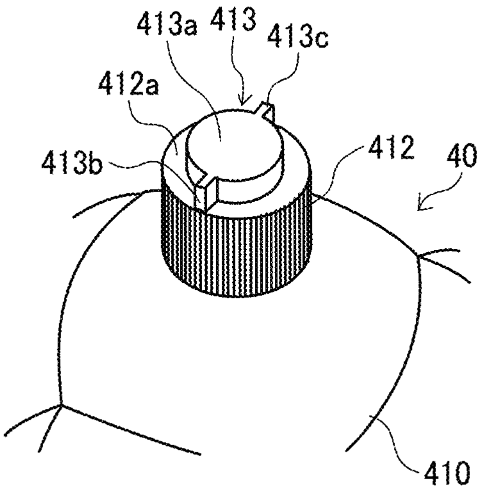
FIG. 7 is a schematic enlarged partial perspective view of the cleaning bottle (cleaning liquid container)

FIG. 7 is a schematic perspective view of a portion of the cleaning bottle 40 (cleaning container).

Figure 8:
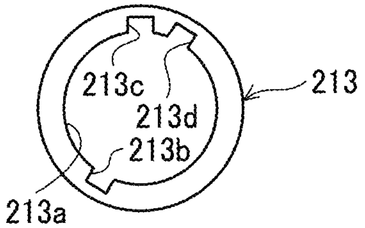
FIG. 8 is a table illustrating shapes of a first fitting part of the liquid tank and a third fitting part of the cleaning bottle (cleaning container)
Figure 8:
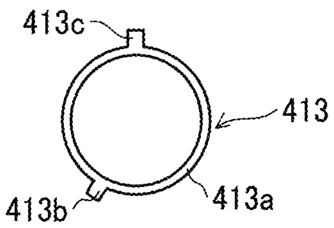

FIG. 8 is a table illustrating shapes of the first fitting part 213 of the liquid tank 21 and a third fitting part 413 of the cleaning bottle 40 (cleaning container).

Figure 9A:
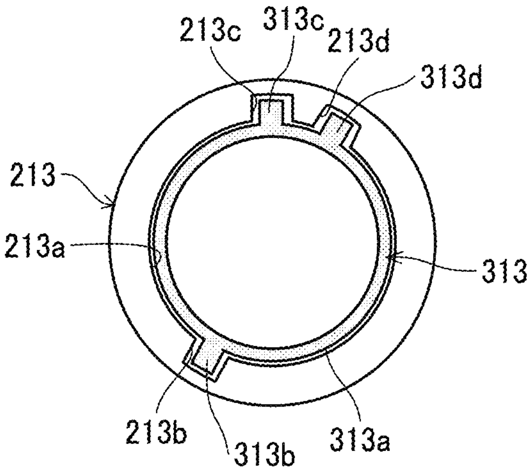
FIGS. 9A and 9B are schematic front views of the first fitting part to which a third fitting part is fitted.
Figure 9B:
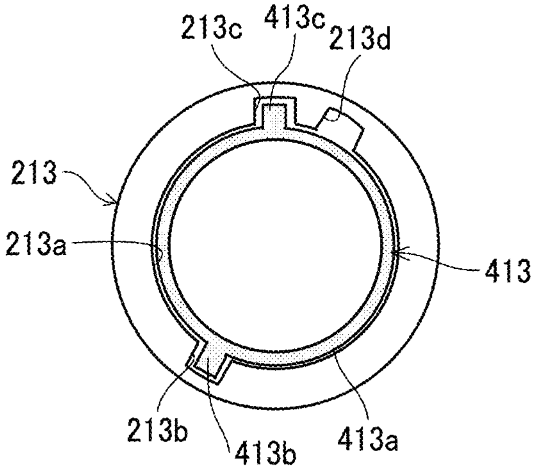

FIGS. 9A and 9B are schematic front views of the first fining part 213 to which the third fitting part 413 is fitted.

The cleaning bottle 40 includes a bottle body 410 (container body), an outlet 411, and a third lid 412. The bottle body 410 contains the cleaning liquid 400. The cleaning liquid 400 in the cleaning bottle 40 is supplied to the liquid tank 21 from the outlet 411 (see FIG. 6). The third lid 412 covers the outlet 411 and is openably and closable.

The third lid 412 of the cleaning bottle 40 is a second key that is detachably attached to the cleaning bottle 40. As illustrated in FIG. 7, the cleaning bottle 40 includes a third fitting part 413 on a top surface 412*a* of the third lid 412 of the cleaning bottle 40. The third fitting part 413 includes a protrusion 413*a* protruding from the top surface 412*a* of the third lid 412 and two protrusions 413*b* and 413*c* protruding in a radial direction from the wall surface of the protrusion 413*a*.

As illustrated in FIG. 9B, the protrusion 413*a* of the third fitting part 413 of the third lid 412 of the cleaning bottle 40 is fitted into the recess 213*a* of the first fitting part 213 of the first lid 212 of the liquid tank 21. Similarly, the protrusions 413*b* and 413*c* of the third fitting part 413 of the third lid 412 of the cleaning bottle 40 is respectively fitted into the recesses 213*b* and 213*c* of the first fitting part 213 of the first lid 212 of the liquid tank 21. FIG. 9A illustrates a fitting state of the first fitting part 213 and the second fitting part 313.

Accordingly, the third lid 412 of the cleaning bottle 40 functions as a second key that openably closes the first lid 212 of the liquid tanks 21 of all colors. Further, the third lid 412 is detachably attached to the cleaning bottle 40 since the third lid 412 is a lid member The printer 1 according to a second embodiment of the present disclosure is described with reference to FIGS. 10A and 10B.

Figure 10A:
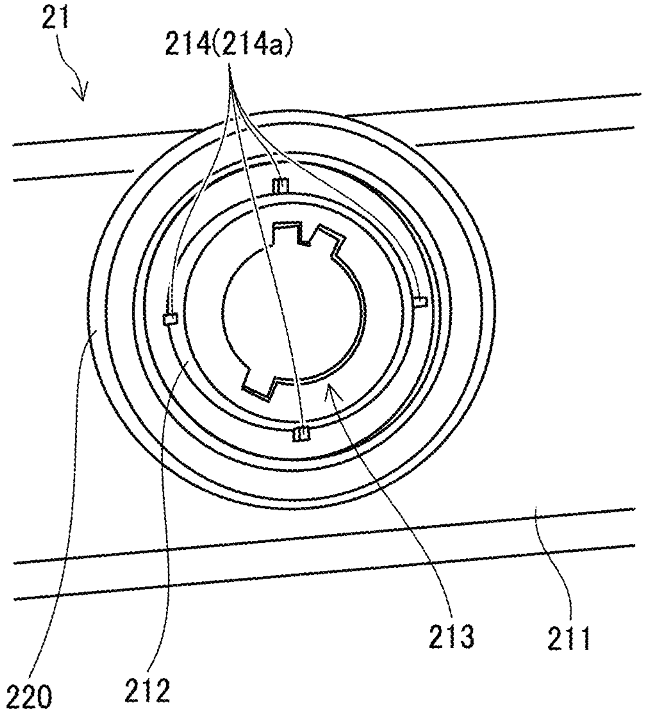
FIGS. 10A and 10B are perspective views of a part of the liquid tank and a cleaning bottle according to a second embodiment of the present disclosure.
Figure 10B:
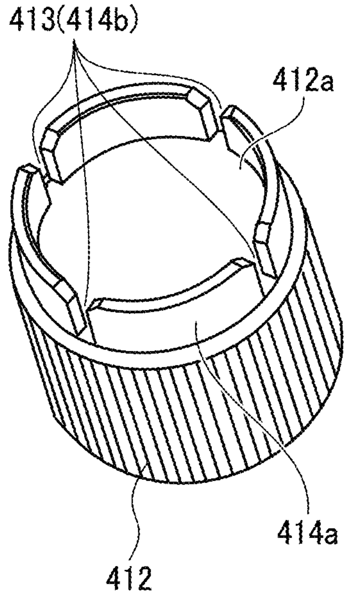

FIGS. 10A and 10B are perspective views of a part of the liquid tank 21 and the cleaning bottle 40 according to the second embodiment.

The printer 1 (liquid discharge apparatus) according to the second embodiment includes a common fitting part 214 in addition to the first fitting part 213 in the first lid 212 of the liquid tank 21. The common fitting part 214 includes multiple protrusions 214*a* around the first lid 212. The protrusions 214*a* of the common fitting part 214 are provided at the same circumferential positions in the liquid tanks 21 of all colors.

The third lid 412 of the cleaning bottle 40 includes a third fitting part 413. The third fitting part 413 includes four recesses 414*b* formed between four protrusions 414*a* protruding from the top surface 412*a*. The recesses 414*b* of the third fitting part 413 is fitted to the protrusions 214*a* of the common fitting part 214 of the liquid tank 21.

Thus, the printer 1 according to the second embodiment uses the third lid 412 of the cleaning bottle 40 to open the first lid 212 of the liquid tanks 21 of all colors as in the printer 1 according to the first embodiment.

The printer 1 (liquid discharge apparatus) according to a third embodiment of the present disclosure is described with reference to FIGS. 11A and 11B.

Figure 11A:
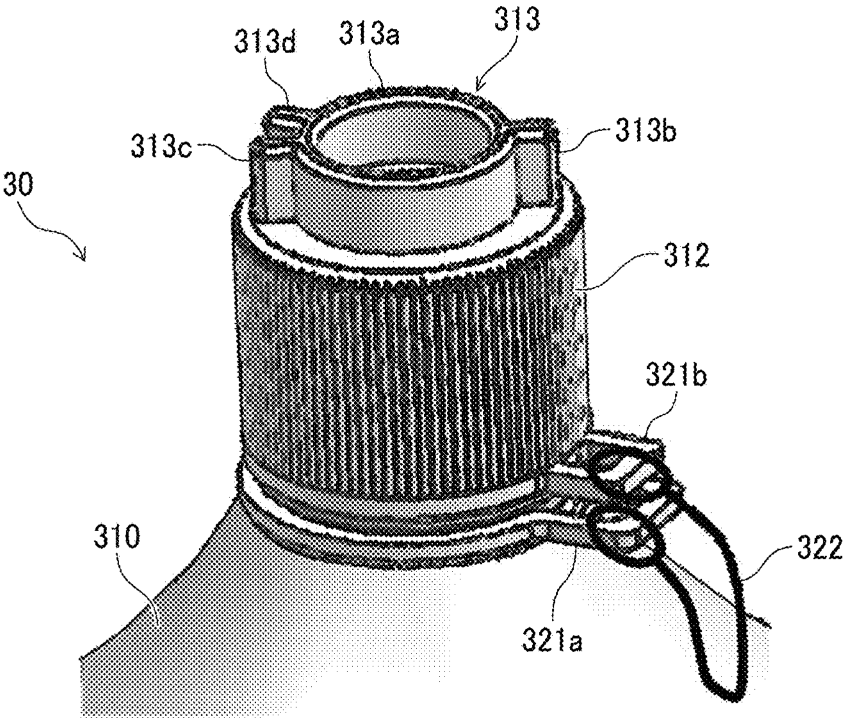
FIGS. 11A and 11B are perspective views of a part of the refill bottle according to a third embodiment of the present disclosure.
Figure 11B:
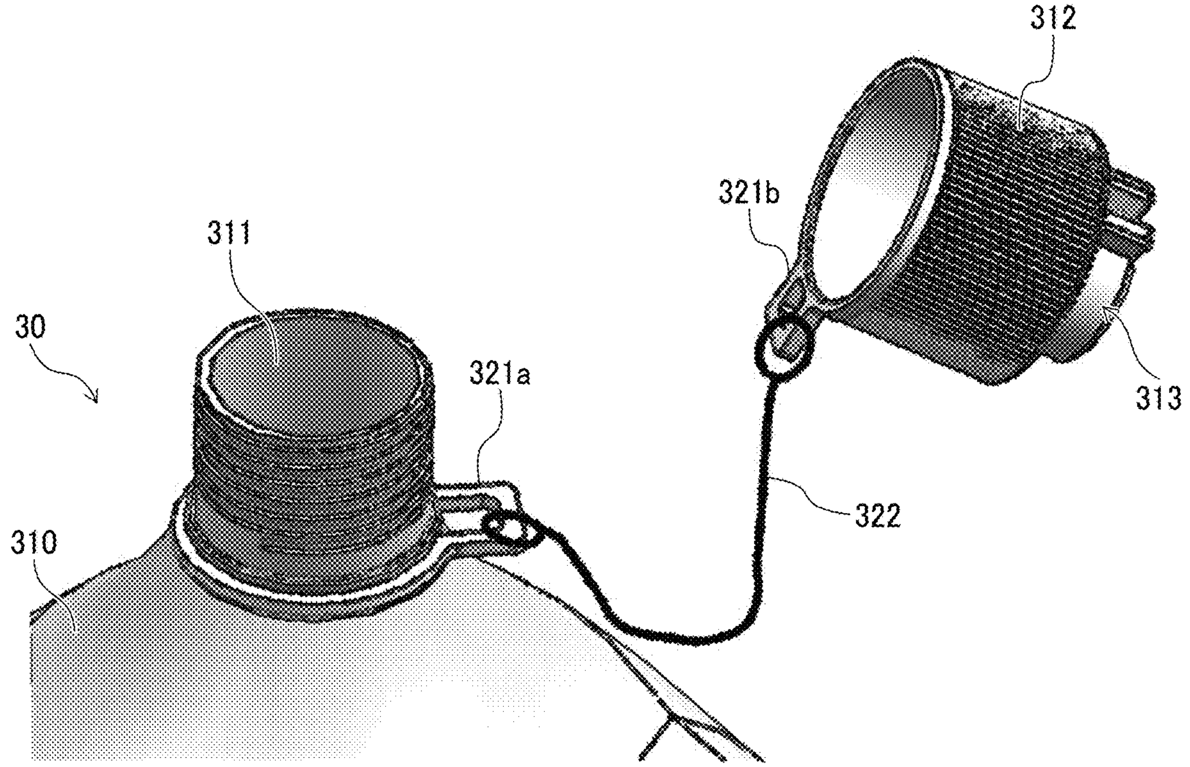

FIGS. 11A and 11B are perspective views of a part of the refill bottle 30 according to the third embodiment.

The second lid 312 serving as the first key of the refill bottle 30 includes latches 321*a* and 321*b* and a connector 322. The connector 322 couples (connects) the latch 321*a* and the latch 321*b*. The latch 321*a* is attached to the outlet 311 of the bottle body 310. The latch 321*b* is formed on the second lid 312.

Thus, the printer 1 according to the third embodiment prevents the second lid 312 of the refill bottle 30 from being lost after the second lid 312 is removed (detached) from the bottle body 310 of the refill bottle 30 (refill container), and the first lid 212 of the liquid tank 21 is opened or closed. Since the second lid 312 is removable (detachable) from the outlet 311 and fitted to the first fitting part 213 of the first lid 212 of the liquid tank 21 the printer 1 according to the third embodiment improves operability of the refill operation. Thus, the printer 1 (liquid discharge apparatus) according to the third embodiment improves operability of the refill operation.

In each of the above-described embodiments, the second lid 312 of the refill bottle 30 (refill container) and the third lid 412 of the cleaning bottle 40 (cleaning container) serve as the keys. However, the refill bottle 30 and the cleaning bottle 40 may include a key separately from the second lid 312 and the third lid 412. The key is detachable from the bottle body 310 and 410 (container body).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A liquid discharge apparatus comprising:
a head to discharge a liquid; and
a liquid container to contain the liquid to be supplied to the head,
the liquid container comprising:
an inlet from which the liquid is supplied to the liquid container; and
a first lid to cover and openably close the inlet, the first lid having a first fitting part fittable to a first key of a second lid detachably attached to a refill bottle containing the liquid.

2. The liquid discharge apparatus according to claim 1,
wherein the first key of the refill bottle has protrusions; and
the first fitting part of the liquid container has recesses fittable to the protrusions.

3. The liquid discharge apparatus according to claim 2,
wherein the protrusions of the first key of the refill bottle respectively protrude in multiple radial directions; and
the recesses of the first fitting part of the first lid of the liquid container are respectively disposed in the multiple radial directions corresponding to the protrusions respectively fitted to the recesses.

4. The liquid discharge apparatus according to claim 1,
wherein the first key of the refill bottle has recesses; and
the first fitting part of the liquid container has protrusions fittable to the recesses.

5. The liquid discharge apparatus according to claim 1, wherein the first fitting part is on a top surface of the first lid.

6. The liquid discharge apparatus according to claim 1, wherein the liquid container further comprises:

a wall surrounding a periphery of the first lid.

7. The liquid discharge apparatus according to claim 1, wherein the refill bottle comprises multiple refill bottles each including the first key having a shape different from shapes of other first keys, the liquid container comprises multiple liquid containers configured to respectively contain multiple types of liquids, the multiple liquid containers each including the first fitting part having a shape different from shapes of other first fitting parts, and the first fitting part of one of the multiple liquid containers is finable only to the first key of one of the multiple refill bottles corresponding to said one of the multiple liquid containers.

8. The liquid discharge apparatus according to claim 7, wherein the first lid of each of the multiple liquid containers has a common fitting part, common among the multiple liquid containers.

9. The liquid discharge apparatus according to claim 8, wherein the first fitting part of the first lid of each of the multiple liquid containers includes the common fitting part.

10. The liquid discharge apparatus according to claim 8, wherein the first lid of each of the multiple liquid containers includes the common fitting part in addition to the first fitting part.

11. The liquid discharge apparatus according to claim 8, wherein the common fitting part has a shape fittable to a second key detachably attached to a cleaning bottle containing a cleaning liquid.

12. A refill container comprising:

a container body containing a liquid to be supplied to a liquid container in a liquid discharge apparatus;

an outlet from which the liquid is supplied to the liquid container; and a first key of a second lid detachably attached to the outlet, the first key fittable to a first fitting part of a first lid of the liquid container.

13. The refill container according to claim 12, wherein the first key is a second lid configured to cover the outlet of the refill container.

14. A liquid container for use in a liquid discharge apparatus, the liquid container comprising:

a container body containing a liquid;

an inlet from which the liquid is supplied to the container body; and a first lid configured to cover and openably close the inlet, the first lid having a first fitting part fittable to a first key of a second lid detachably attached to a refill bottle containing the liquid.

15. The liquid discharge apparatus according to claim 1, wherein the first lid of the liquid container is rotatable and removable by the first key fitted to the first fitting part to open the inlet.

* * * * *